Nov. 11, 1952 M. D. WELSH 2,617,670
ADJUSTABLE HANDLE BAR
Filed July 14, 1950

INVENTOR.
MATILDA D. WELSH
BY
ATTORNEY

Patented Nov. 11, 1952

2,617,670

UNITED STATES PATENT OFFICE 2,617,670

ADJUSTABLE HANDLE BAR

Matilda D. Welsh, Ladue, Mo.

Application July 14, 1950, Serial No. 173,799

2 Claims. (Cl. 287—14)

This invention pertains to baby carriages and more particularly to means for adjusting the position of the handle bar to different elevations.

In accordance with this invention, generally stated, the handle-bar is pivotally supported on the frame of the baby carriage so that it may be moved on its pivot to different positions. An alignment plate is loosely supported on the frame on the same pivot as the handle-bar and is maintained in alignment with respect to the frame by engagement with a fixed supporting member on the frame. Said plate is yieldingly retained in position by a spring on the handle-bar pivot but may be moved laterally of the frame without losing engagement with said supporting member. This alignment plate is provided with a plurality of sockets and the handle-bar has fixed thereon a complementary keeper or detent engageable in one of said sockets. When the alignment plate is sprung outward from the frame, it can be moved clear of said keeper so that the handle-bar may be shifted on its pivot and the keeper engaged in any of said sockets, thereby changing the elevation of the handle.

Figure 1:
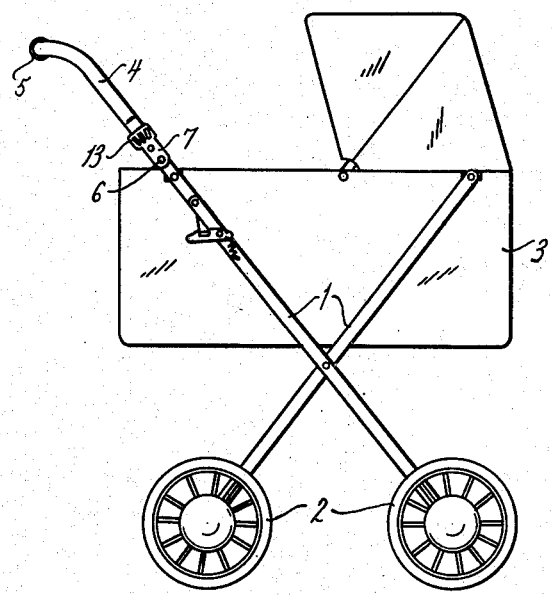
Figure 2:
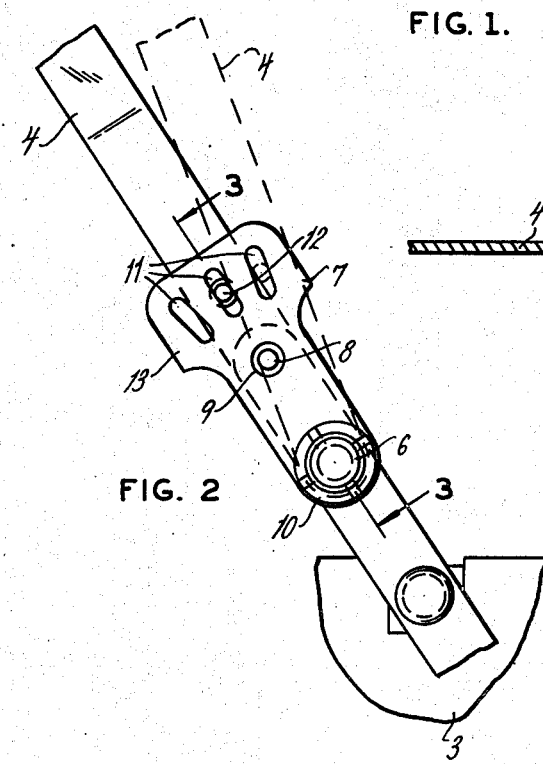
Figure 3:
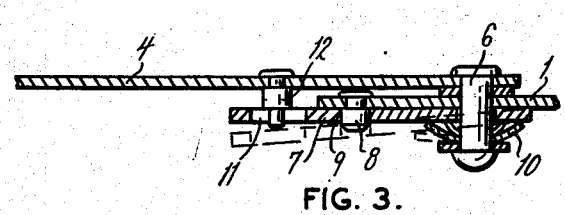

A preferred embodiment of this invention is illustrated in the accompanying drawing, in which Fig. 1 is a side view of a baby carriage having an adjustable handle-bar embodying this invention;

Fig. 2 is an enlarged view of a portion of the frame and the handle-bar at the junction between the two; and Fig. 3 is a section on line 3—3 of Fig. 2.

Referring to the drawing, the baby carriage illustrated comprises a frame 1 which may be of the folding type mounted on wheels 2 and having a body 3 of any suitable type, in which the child may be carried. A pair of handle-bars 4, only one of which appears in the drawing, carries between them a handle 5 in the usual manner.

The handle-bar 4 is mounted on the frame 1 by a pivot pin 6. Also loosely mounted on the pin 6 is an alignment plate 7. A second supporting pin 8 is fixed on the frame 1 and is movably engaged in a perforation 9 in the plate 7. The pins 6 and 8 support the plate 7 and maintain the same in alignment with respect to the frame 1.

Between the head of the pivot pin 6 and the plate 7 a spring washer 10 is mounted on the pin so as to bear upon the plate 7 to keep it pressed against the frame 1. The plate may, however, be moved outward against the tension of the spring 10 as indicated in dotted lines in Fig. 3. When moving to this position, the plate moves with respect to the pin 8 but does not lose its engagement therewith so that its alignment is maintained. The plate 7 is formed with a plurality of slots 11 forming sockets for engagement by a detent or keeper 12 fixed to the handle-bar 4. As will be clear from Fig. 3, the keeper 12 is clear of the sockets 11 when the plate is moved to its dotted line position. Accordingly, the handle-bar 4 may then be moved up or down so as to locate the keeper 12 for engagement with any of the sockets 11. When the plate is released and returns to its full line position, Fig. 3, the engagement of the keeper 12 with its socket fixes the position of the handle-bar 4.

It will be seen that this invention provides a simple and rugged construction for providing adjustment for a handle-bar of this type. The plate 7 is maintained in alignment by the pin 8 which provides a fixed alignment member which is movably engaged by said plate so as to maintain the alignment thereof while the plate 1 is moved for permitting adjustment of the handle-bar. The plate 7 thus fixed in alignment provides a cantilever by which the handle-bar 4 is supported through the engagement of the keeper 12 with one or the other of the sockets 11. It will be noted that the head portion 13 of the plate 7 is enlarged so as to project laterally beyond the sides of the handle-bar 4 to provide a thumb-piece against which the operator may press to move the plate outward for adjustment of the keeper 12 from one socket to another. Once the keeper has been engaged in a socket and the plate 7 released, the handle-bar is rigidly held in its adjusted position.

Various changes may be made in the details of construction, within the scope of the appended claims, without departing from the spirit of this invention. Parts of the invention may be used without the whole and improvements may be added while retaining some or all of the advantages of the invention.

I claim:

1. An adjustable handle-bar for a baby carriage having a frame, comprising, a handle-bar pivoted to said frame, a plate loosely mounted on the pivot of said handle-bar, an alignment pin fixed on said frame and loosely engaged in a perforation in said plate to fix the alignment of the latter while permitting movement thereof transverse to the plane of said frame, a spring on said pivot adapted to restrain such transverse movement, said plate having a plurality of sockets in different alignments, and a keeper on said handle-bar engageable with any of said sockets.

2. An adjustable handle-bar for a baby carriage having a frame, comprising, a handle-bar pivoted to said frame, a cantilever movably supported on the pivot of said handle-bar and movably engaging a second support on said frame adapted to maintain said cantilever in fixed alignment with respect to said frame while permitting movement thereof transverse to the plane of said frame, a spring on said frame adapted to restrain such transverse movement, and a supporting connection between said handle-bar and said cantilever, said connection being shiftable upon such transverse movement of said cantilever to vary the alignment of said handle-bar with respect to said frame.

MATILDA D. WELSH.

REFERENCES CITED

The following references are of record in the file of this patent:

UNITED STATES PATENTS

| Number | Name | Date |
|---|---|---|
| 2,226,000 | Kroll et al. | Dec. 24, 1940 |
| 2,285,700 | Feldman | June 9, 1942 |
| 2,423,311 | Griffin | July 1, 1947 |

FOREIGN PATENTS

| Number | Country | Date |
|---|---|---|
| 444,425 | Great Britain | Mar. 20, 1936 |